(12) United States Patent
Gschwind et al.

(10) Patent No.: US 9,639,370 B1
(45) Date of Patent: May 2, 2017

(54) SOFTWARE INSTRUCTED DYNAMIC BRANCH HISTORY PATTERN ADJUSTMENT

(71) Applicant: International Business Machines Corporation, Armonk, NY (US)

(72) Inventors: Michael Karl Gschwind, Chappaqua, NY (US); Christian Jacobi, Poughkeepsie, NY (US); Anthony Saporito, Highland, NY (US); Chung-Lung K. Shum, Wappingers Falls, NY (US); Timothy J. Slegel, Staatsburg, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 14/969,294

(22) Filed: Dec. 15, 2015

(51) Int. Cl.
*G06F 9/38* (2006.01)

(52) U.S. Cl.
CPC .................. *G06F 9/3844* (2013.01)

(58) Field of Classification Search
CPC ...................................... G06F 9/3844
USPC ........................................ 712/240
See application file for complete search history.

(56) References Cited

U.S. PATENT DOCUMENTS

| | | | | |
|---|---|---|---|---|
| 5,175,827 A * | 12/1992 | Morisada | ................ | G06F 9/325 712/240 |
| 5,228,131 A * | 7/1993 | Ueda | ..................... | G06F 9/3826 712/240 |
| 5,454,117 A * | 9/1995 | Puziol | ................... | G06F 9/3806 712/23 |
| 6,282,663 B1 * | 8/2001 | Khazam | .................... | G06F 1/32 712/233 |
| 6,427,206 B1 * | 7/2002 | Yeh | ....................... | G06F 9/3844 712/236 |
| 6,499,101 B1 * | 12/2002 | Henry | ................... | G06F 9/3848 712/234 |
| 6,662,360 B1 * | 12/2003 | Hay | ....................... | G06F 9/3848 712/239 |
| 6,920,549 B1 * | 7/2005 | Ukai | ..................... | G06F 9/3804 712/207 |
| 7,673,122 B1 * | 3/2010 | Song | ..................... | G06F 9/3846 712/239 |

(Continued)

OTHER PUBLICATIONS

Anonymously, et al.,"Method to Exclude Bad Patterns From a Pattern History Table Branch Predictor", IP.com Prior Arta Database Technical Disclosure, Jan. 19, 2010, pp. 1-5.

(Continued)

*Primary Examiner* — Yuqing Xiao
(74) *Attorney, Agent, or Firm* — Cantor Colburn LLP; William A. Kinnaman, Jr.

(57) ABSTRACT

Techniques relate to dynamic branch history pattern adjustment. Past histories of branch instruction results are collected as part of a branch history pattern. A branch prediction structure with a pattern history buffer predicts a direction of a branch instruction using the branch history pattern. The branch prediction structure executes one or more branch history pattern recording adjustment instructions prior to one or more branch instructions. Executing the one or more branch history pattern recording adjustment instructions changes default behaviors of recording and usage of the branch history pattern.

16 Claims, 7 Drawing Sheets

```
       Ba  (NT)
       Bb  (T)
       Bc  (NT)
       Bd  (T)
       B1  (NT)
       B2  (T)
       B3  (NT)
       B4  (T)
       FBPT-N              <== B5 IS FORCED TO BE RECORDED AS NOT TAKEN
       B5  (NT, T, T, NT...)  <== THIS BRANCH SOMETIME TAKEN, SOMETIMES NOT
       B6  (T TO X, T TO X1)  <== THIS BRANCH ALWAYS TAKEN, BUT SOMETIMES TO X,
                                  SOMETIMES TO X1
   X   FBPT-S              <== B7 IS FORCED TO HAVE ITS RECORDING SKIPPED
       B7  (NT)
   X1  B8  (T)
       B9  (NT)
       B10 (T)             <== HOW CAN WE PREDICT THAT THIS IS USUALLY TAKEN?
```

(56) References Cited

U.S. PATENT DOCUMENTS

| | | | |
|---|---|---|---|
| 7,673,124 B2 | 3/2010 | Kwak | |
| 8,078,852 B2 | 12/2011 | Al-Otoom et al. | |
| 8,745,362 B2 | 6/2014 | Bell, Jr. et al. | |
| 8,862,861 B2 * | 10/2014 | Olson | 712/233 |
| 8,874,885 B2 | 10/2014 | Bonanno et al. | |
| 8,954,946 B2 | 2/2015 | Jin et al. | |
| 2005/0149710 A1 * | 7/2005 | Hikichi | G06F 9/3806 |
| | | | 712/240 |
| 2006/0095722 A1 * | 5/2006 | Biles | G06F 8/4441 |
| | | | 712/34 |
| 2006/0149944 A1 * | 7/2006 | Eisen | G06F 9/30058 |
| | | | 712/235 |
| 2006/0190710 A1 * | 8/2006 | Rychlik | G06F 9/325 |
| | | | 712/240 |
| 2006/0271770 A1 * | 11/2006 | Williamson | G06F 9/3844 |
| | | | 712/239 |
| 2007/0130450 A1 * | 6/2007 | Chiao | G06F 9/3802 |
| | | | 712/239 |
| 2013/0024661 A1 | 1/2013 | Abdallah | |
| 2013/0339698 A1 | 12/2013 | Bonanno et al. | |
| 2014/0156978 A1 * | 6/2014 | Al-Otoom | G06F 9/3844 |
| | | | 712/240 |
| 2015/0309794 A1 * | 10/2015 | Wilson | G06F 9/3806 |
| | | | 712/240 |

OTHER PUBLICATIONS

T.Y. Yeh, et al.,"Increasing the Instruction Fetch Rate via Multiple Branch Prediction and a Branch Address Cache", International Conference on Supercomputing Anniversary, vol. 7 No. 93, 1993, pp. 1-10.

* cited by examiner

FIG. 5

Ba  (NT)
Bb  (T)
Bc  (NT)
Bd  (T)
B1  (NT)
B2  (T)
B3  (NT)
B4  (T)
FBPT-N         <== B5 IS FORCED TO BE RECORDED AS NOT TAKEN
B5  (NT, T, T, NT...)   <== THIS BRANCH SOMETIME TAKEN, SOMETIMES NOT
B6  (T TO X, T TO X1)   <== THIS BRANCH ALWAYS TAKEN, BUT SOMETIMES TO X, SOMETIMES TO X1

X   FBPT-S      <== B7 IS FORCED TO HAVE ITS RECORDING SKIPPED
    B7  (NT)
X1  B8  (T)
    B9  (NT)
    B10 (T)         <== HOW CAN WE PREDICT THAT THIS IS USUALLY TAKEN?

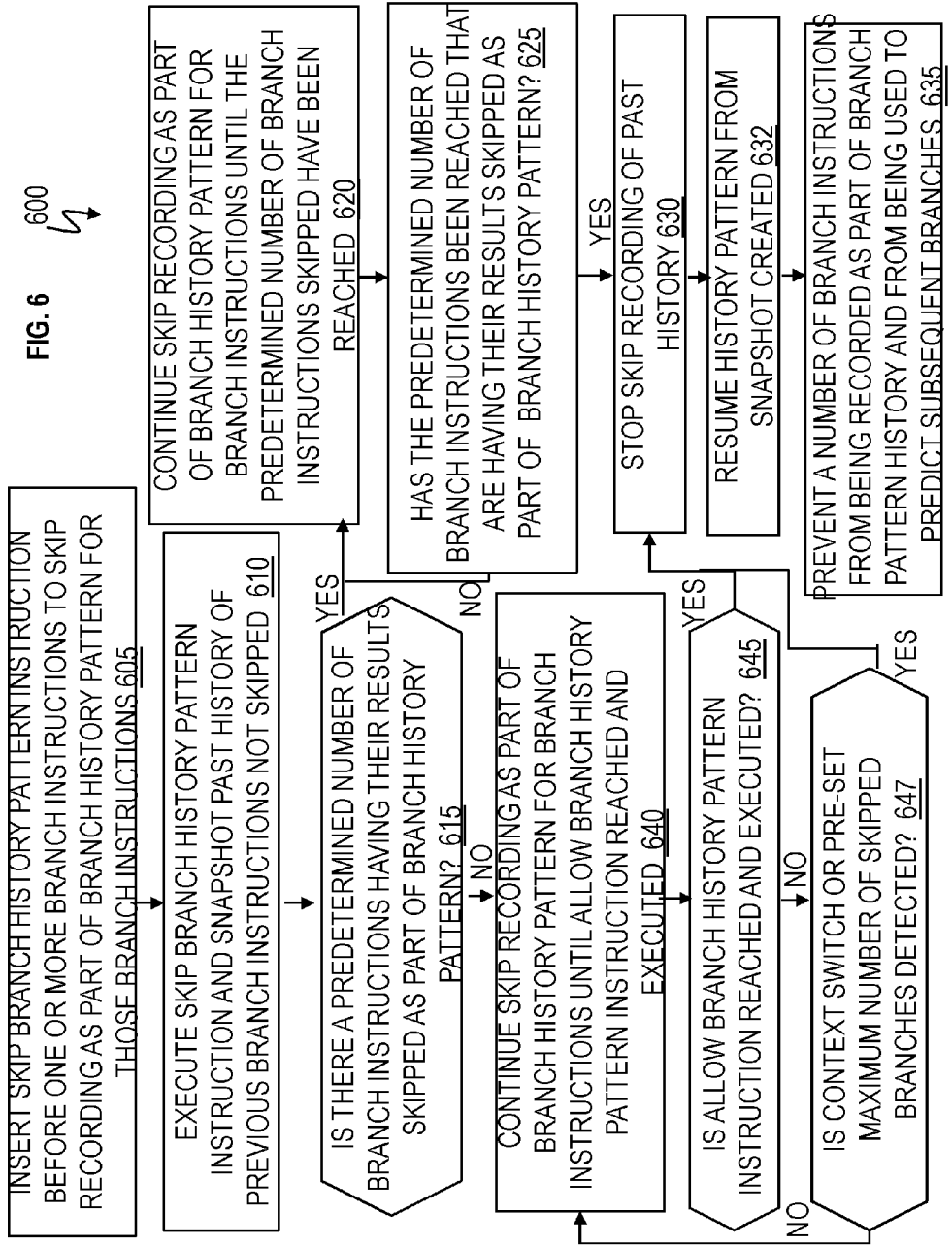

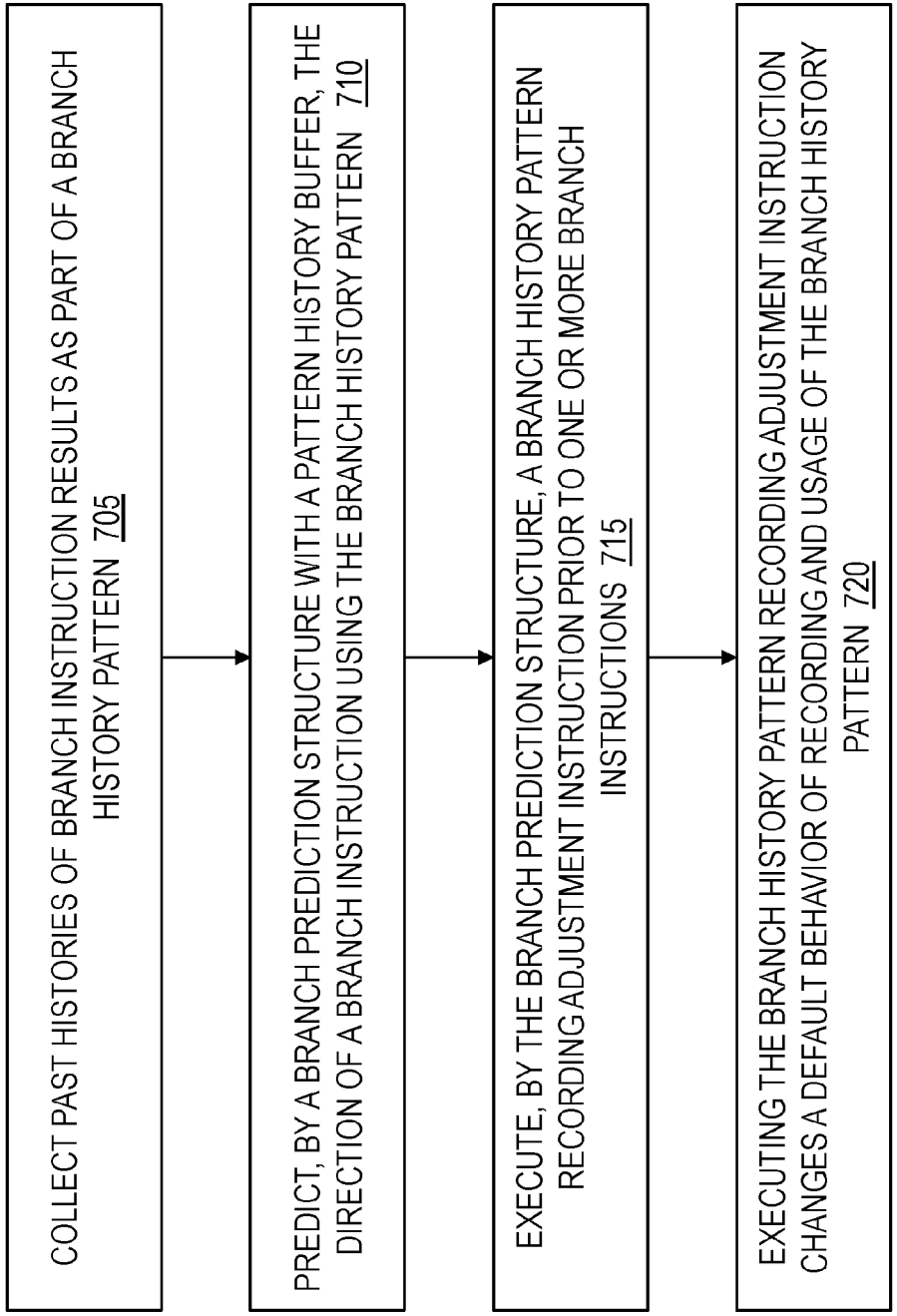

SOFTWARE INSTRUCTED DYNAMIC BRANCH HISTORY PATTERN ADJUSTMENT

BACKGROUND

The present invention relates generally to computer processors, and more specifically, to software instructed dynamic branch history pattern adjustment.

In computer architecture, a branch predictor is a digital circuit that tries to guess which way a branch will go before this is known for sure. The purpose of the branch predictor is to improve the flow in the instruction pipeline. Branch predictors play a beneficial role in achieving high effective performance in many modern pipelined microprocessor architectures. Two-way branching is usually implemented with a conditional jump instruction. A conditional jump can either be "not taken" and continue execution with the first branch of code which follows immediately after the conditional jump, or it can be "taken" and jump to a different place in program memory where the second branch of code is stored. It is not known for certain whether a conditional jump will be taken or not taken until the condition has been calculated and the conditional jump has passed the execution stage in the instruction pipeline. Besides predicting the direction of a conditional jump, a branch predictor may also predict where the target address of a jump or a subroutine call is in program memory.

Instruction pipelining is a technique that implements a form of parallelism called instruction-level parallelism within a single processor. It therefore allows faster central processing unit (CPU) throughput (i.e., the number of instructions that can be executed in a unit of time) than would otherwise be possible at a given clock rate. The basic instruction cycle is broken up into a series called a pipeline. Rather than processing each instruction sequentially (finishing one instruction before starting the next), each instruction is split up into a sequence of steps so different steps can be executed in parallel and instructions can be processed concurrently (starting one instruction before finishing the previous one). The classic reduced instruction set computing (RISC) pipeline comprises: 1) Instruction fetch; 2) Instruction decode and register fetch; 3) Execute; 4) Memory access; and 5) Register write back.

SUMMARY

Embodiments include a method, system, and computer program product for dynamic branch history pattern adjustment. Past histories of branch instruction results are collected as part of a branch history pattern. A branch prediction structure with a pattern history buffer predicts a direction of a branch instruction using the branch history pattern. The branch prediction structure executes one or more branch history pattern recording adjustment instructions prior to one or more branch instructions. Executing the one or more branch history pattern recording adjustment instructions changes default behaviors of recording and usage of the branch history pattern.

BRIEF DESCRIPTION OF THE DRAWINGS

FIG. 5 depicts a set of branch history patterns and its corresponding pseudo code listing only branch instructions along with inserted force branch pattern instructions in accordance with an embodiment.

FIG. 6 is a flow chart of a software instructed dynamic branch history pattern adjustment in accordance with an embodiment FIG. 7 is a flow chart of a method for dynamic branch history pattern adjustment according to an embodiment.

DETAILED DESCRIPTION

Processors use pipelines to increase the speed with which an instruction stream may be processed. The pipeline may have a number of processing stages, and as one instruction is processed in one stage, a next instruction may be processed in an upstream stage. When the stream of instructions includes a branch instruction, the processor may need to execute the branch instruction, or run the branch instruction through the whole pipeline, to determine a next instruction to execute. To increase efficiency, processors may determine when the instruction stream includes a branch instruction and may predict which instruction should follow the branch instruction in the pipeline. A branch instruction may also be any instruction that can cause program flow changes that are not sequential in program memory. For example, a conditional or unconditional, subroutine or program, call or return can also be viewed as branch instructions.

Therefore, state-of-the-art microprocessor designs comprise dedicated structures to remember past histories of branch instructions on whether the branch instructions are taken (i.e., redirected), or not taken, and if taken, what is the target instruction address related to the past history. By using various branch prediction techniques, the processor can predict the instruction flow after a branch instruction. By having correct predictions, a pipelined microprocessor can execute instructions seamlessly without hiccups. In the case when a prediction cannot be made, the pipeline stalls until the branch is executed and resolved, causing delays in instruction processing. In the case where predictions are wrong, the processor pipeline flushes, potentially causing more performance damage.

In general, the usefulness and correctness of branch prediction relies on the fact that software program behavior can be predicted based on prior histories of how local segments of code and global program flows. Segments of code are smaller sections of the software program. The size of the history structures largely affects the effectiveness of the branch prediction hardware. Such structures holding past branch related histories are limited in size, since the structures are built with physical storage inside the microprocessor. According to embodiments, it is beneficial to keep past histories of those branches that are more frequently encountered, and more likely to be correct, than those that are only encountered once in a long while, or not likely to be predicted correctly.

Figure 1:
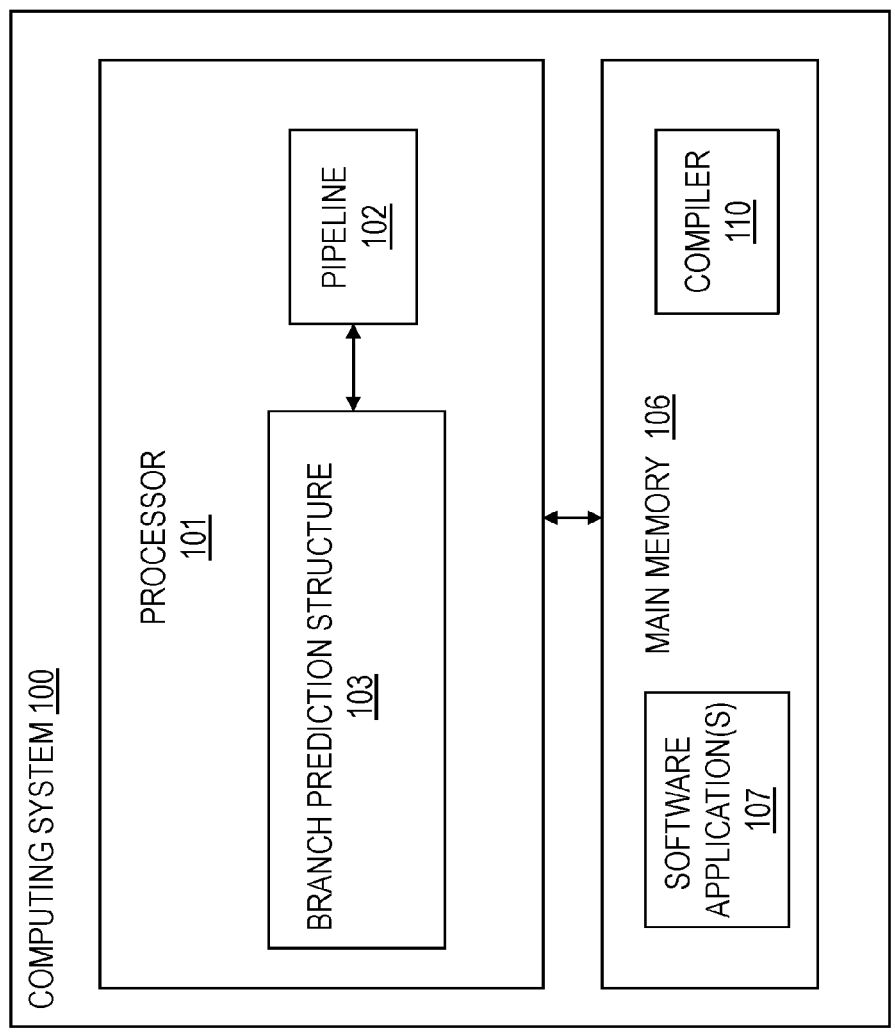
FIG. 1 depicts a computer system for implementing software instructed dynamic branch history pattern adjustment in accordance with an embodiment.

Turning now to FIG. 1, an embodiment of a computer system 100 is generally shown. Computer system 100 includes a processor 101 that is in communication with a main memory 106. The processor 101 executes applications such as application 107 that are stored in main memory 106 by processing instructions using a pipeline 102. A compiler 110 may be utilized to compile instructions of the application 107. Pipeline 102 fetches, decodes, executes, and completes instructions. During the execution of such applications, branch instructions may be encountered. Branch prediction logic of branch prediction structure 103 is used to predict the direction (i.e., taken or not taken) and sometimes target of branch instructions at prediction time, which is before execution and completion time and allows fetching and decoding to continue in the predicted program flow from the branch. The branch prediction structure 103 is updated at completion time, when the direction and target address of the branch is known. In some designs, the branch prediction structure may have additional structures that are updated during execution time in an out of order pipeline to have the updated history ready for use earlier than if it would have waited until completion time.

Figure 2:
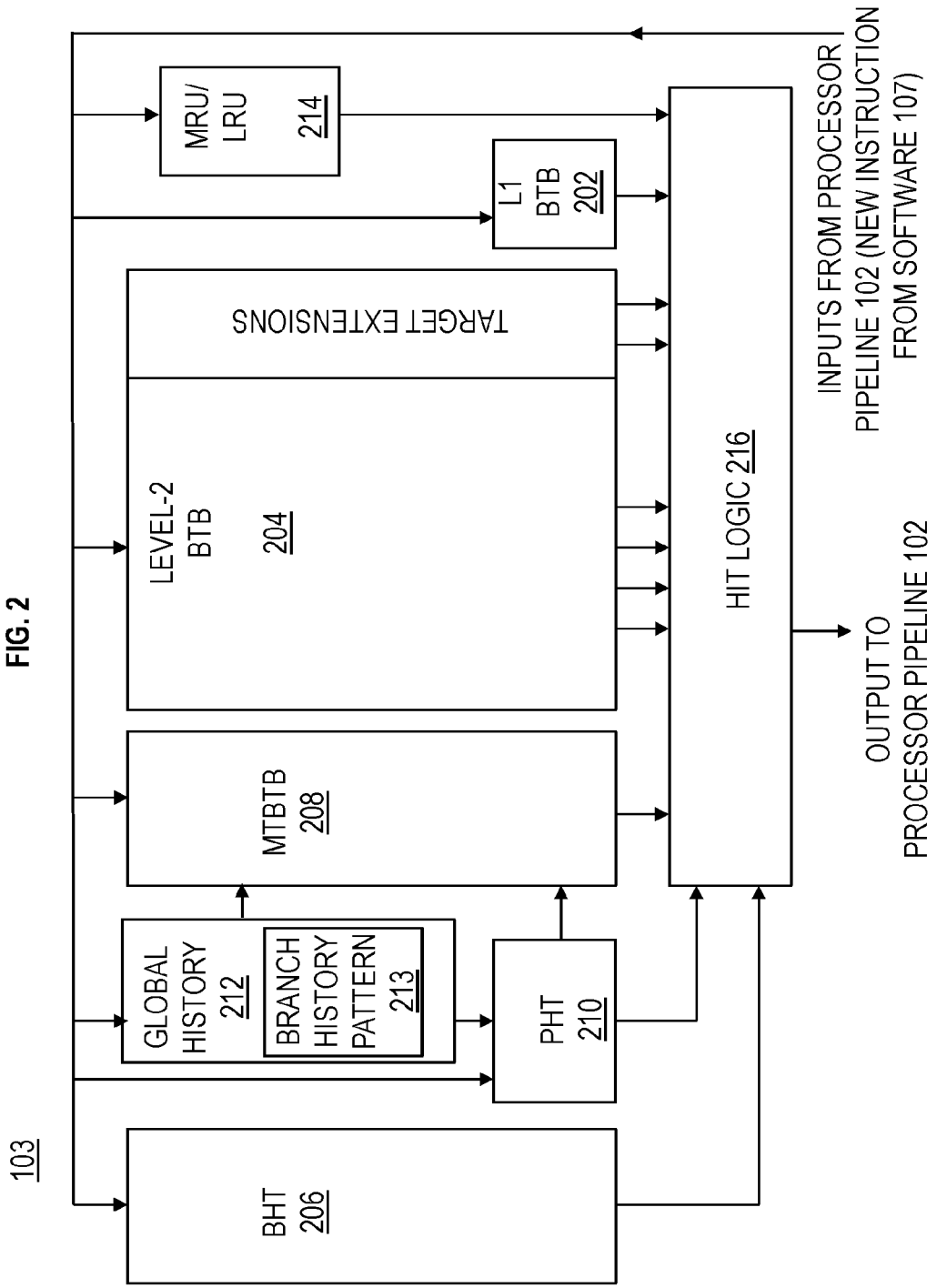
FIG. 2 depicts an example branch prediction structure in accordance with an embodiment.

FIG. 2 illustrates example details of the branch prediction structure 103 according to an embodiment. The branch prediction structure 103 is configured to allow suppression and/or override on the creation of pattern history used to read and/or update a pattern history table 210.

In one implementation, the branch prediction structure 103 may be implemented in the, e.g., IBM® z10™ microprocessor. The branch prediction structure 103 may include two levels of branch target prediction: a small, low latency level-1 branch target buffer (L1 BTB) 202 for tight loop handling, and a 10K-entry full-function branch target buffer (Level-2 BTB) 204 for maintaining longer-term history. To optimize area and performance, the target addresses are compressed and presumed to lie within a certain range of the branch instruction address; three of the five BTB associativity sets support a 1-Mbyte range; the other two sets support a 1-Gbyte range. The BTB2 structure (204) includes a target extensions structure to extend the branch target address to a bigger range relative to the branch itself. The BTBs are complemented by a traditional branch-history table (BHT) 206 to predict the direction of conditional branches; a multiple-target predictor (MTBTB) 208 to predict branch targets for switch tables, subroutine returns, and so on; and a pattern history table (PHT) 210 (or pattern based history table, pattern history buffer, etc.,) to enhance BHT direction prediction with path-based context. The MTBTB 208 and PHT 210 are indexed by unique hash values derived from the current branch history pattern 213 collected inside the global history logic 212, reflecting the directions and branch targets of the last several branches processed. In addition, the current branch history pattern 213 maintained inside the global history logic 212 is also used to update the contents of PHT 210 to assist the BHT 206 in predicting those branches that are not effectively predicted by the BHT 206.

Information from the most recently used (MSU) and/or least recently used (LRU) unit 214 is input into hit logic 216. Hit logic 216 also receives input from level-1 BTB 202, level-2 BTB 204 and its target extensions, MTBTB 208, PHT 210, and BHT 206.

The output from the hit logic 216 of the branch prediction structure 103 provides prediction to influence the rest of the processor pipeline 102. In general, the branch prediction structure 103 provides predictions to the instruction fetching and decoding logic to allow a predicted program flow to be processed without interruptions. The processor pipeline 102 sends inputs to update the branch prediction structure 103. These inputs include the actual directions and, if needed, the targets of branch instructions. These inputs also include, but are not limited to, the correctness of the direction and/or target prediction. In some implementations, the correctness may be determined by the branch prediction structure 103 itself, and the result be sent to the processor pipeline 102.

Embodiments improve the effectiveness of the PHT 210 by having software application 107 provide a hint to override the default generation of the global path history register 212 used to read or update the pattern history table 210. One feature of the branch prediction algorithm involves capturing the current history of branches' executed directions (taken versus not taken) to create a pattern, the current branch history pattern 213, that can be used in the pattern history table 210. As understood by one skilled in the art, such a pattern is then used as a look up in the pattern based history table 210 to predict the next branch's potential direction. In some designs, the indexing to the pattern based history table 210 may include the use of hashing functions of past directions and potentially also part of or all of the target addresses of the branches. This technique is usually used for predicting those branches that are not effectively predictable by the BHT 206, but have a very high correlation to "how the program gets here" which can be approximated by its corresponding branch history patterns. For example, there may be a program flow of:

If (a=1) a=2;
If (b=1) b=2;
If (a=b) c=1.

In the above program flow, the $3^{rd}$ branch, based on the checking of (a=b), can be predicted taken if the $1^{st}$ and $2^{nd}$ branches were previously both taken; and this branch path pattern of 111 will be 100% correct. Another example program flow is of:

If (a=1) a=2;
If (b=1) b=2;
If (a=b) call x; else y.

In the above program flow, the call to x, and not y, can also be predicted if the $1^{st}$ and 2rd branches were both taken.

Also, such pattern capture, generation, and storage can be hashed selectively with some part of the instruction address (or program counter) of the branch itself. The current history pattern 213 may be used to index the pattern history table 210 from which the prediction is directly read. Since the storage of such pattern history table 210 can be limited, there is a desire to keep it more efficient.

Figure 3:
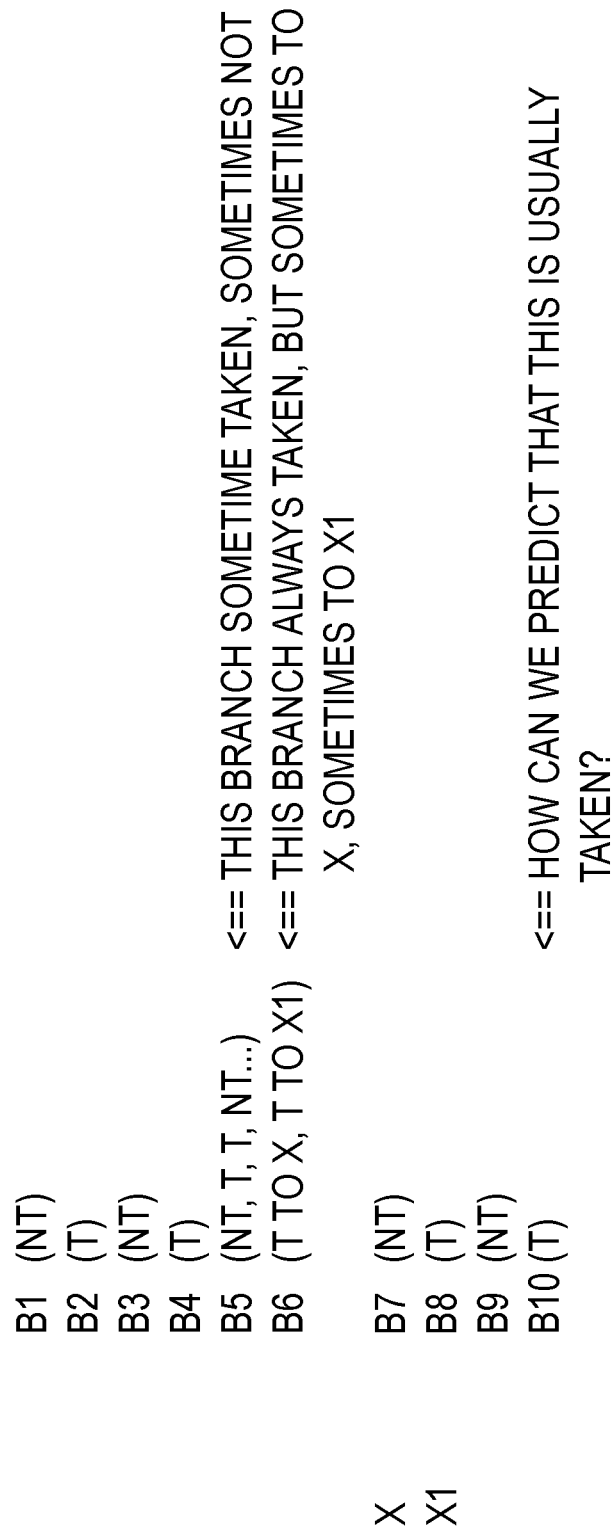
FIG. 3 depicts a set of branch history patterns and its corresponding pseudo code listing only branch instructions in accordance with an embodiment.

Consider the following program flow of branches (NT is not taken, T is taken), and assume the design is using the 8 past branch histories to lookup the PHT 210 to predict the next branch outcome. It is noted that examples of pseudo code may be utilized for illustrative purposes. FIG. 3 illustrates an example of a set of history patterns and its corresponding pseudo code listing only branch instructions according to an embodiment. In this example, B10 is a branch not consistently taken, but will be taken as the pseudo code proceeds through the branch history patterns as illustrated. In FIG. 3, each branch instruction may be represented by B1, B2, B3, and so forth. The past history of each particular branch instruction may have T for taken or NT for not taken in parenthesis in FIG. 3. However, in some cases, there may be one or more branch instructions that may be taken sometimes and not taken sometimes, or may be taken such that it skips over branches. This back and forth between taken and not taken, or sometimes skipping over branches may not affect the direction of a future branch if only based on the past histories of other branches, according to embodiments. In a traditional branch history pattern collection and management, these "non-impactful" back and forth branches, when collected as part of the current branch history pattern 213, can negatively impact branch prediction effectiveness by requiring additional pattern history table entries in the pattern history table 210.

Referring to FIG. 3, to be able to predict branch B10 to be taken using the corresponding branch history pattern, the pattern history table 210 needs to capture the following 4 patterns of branch past histories in its entries:

T, NT, T, NT, T, NT, T, NT==>T (i.e., for B2, B3, B4, B5 (NT), B6 (T to X), B7, B8, B9);

T, NT, T, T, T, NT, T, NT==>T (i.e., for B2, B3, B4, B5(T), B6 (T to X), B7, B8, B9);

NT, T, NT, T, NT, T, T, NT==>T (i.e., for B1, B2, B3, B4, B5(NT), B6 (T to X1), B8, B9); and NT, T, NT, T, T, T, T, NT==>T (i.e., for B1, B2, B3, B4, B5 (T), B6 (T to X1), B7, B8, B9).

Thus, the set of history patterns require 4 history pattern entries in the pattern history table 210 be stored in order for the branch prediction structure to lookup, and then be able to predict B10 consistently be taken (T) when the program goes through the corresponding illustrated branch paths in FIG. 3. Accordingly, there are 4 cases (based on the 4 pattern history table entries) for which the branch prediction structure 103 determines taken (T) for branch B10. History pattern in this description refers to the results of past branches as taken or not taken. Each individual branch instruction has a past history (which may be called a branch past history), based on its direction, such as taken or not taken. For example, branch B1 may be NT (not taken). A branch history pattern includes the branch past histories of two or more branch instructions. For example, the branch history pattern of branches instructions B1, B2, B3 may be NT, T, NT, and there are 3 past histories included in this branch history pattern. The past histories are the branch instruction results of respectively executing the branch instructions. Each round of executing the branch instructions B1, B2, B3 may produce different branch history patterns. Some designs may include hashes of part of the branch instruction address, and/or the targets of past branches, in addition to the directions, to form the branch history pattern.

Embodiments disclose how to use the concept of blocking results of certain branches from being recording as part of the branch history patterns, allowing a more effective method in capturing branch history patterns, and thus allow more branch history patterns to be captured within a fixed size structure (i.e., the pattern history table 210).

Instead of maintaining branch history patterns in a traditional way, embodiments provide a new instruction(s) for the software application 107 to block past histories of a set of branch instructions from being used in creating a branch history pattern for the pattern history table 210. That is, the identified branches (which are not consistently taken or not taken, regardless of past histories) do not contribute to forming a branch history pattern even though the branches are executed by the pipeline 102 and branch prediction structure 103 in processor 101. The skip pattern history instruction(s) that can be used in the software application 107 can specify a number of branches to be blocked as part of a branch history pattern that may be used in the pattern history table 210. When the number is not practically determined (as indicated in the example in FIG. 3 where B6 can skip B7 sometimes), the new skip pattern history instruction(s) can also set a transient state that block subsequent branches to be used in forming the branch history pattern until the transient state is explicitly reset by an allow pattern history instruction. The processor 101 may also perform an implicit reset of this transient state when it detects a context switch (e.g. taking an asynchronous interrupt), or a pre-defined number of maximum skipped branches are encountered. In a dynamic run-time environment, the just-in-time (JIT) compiler 110 may monitor and collect performance statistics of a generated program code, and in particular, the branch result characteristics of the program at run-time. An example of the collection environment is described in U.S. Pat. No. 9,158,660 "Controlling operation of a run-time instrumentation facility", which herein incorporated by reference. The JIT compiler 110 is configured to analyze the program flow graph and realize that an example program flow as shown in FIG. 3 will benefit from suppressing the branch results of B5, B6 and B7 from being collected as part of the branch history pattern. As such, the JIT compiler 110 can insert the skip branch pattern and allow branch pattern instructions accordingly to reduce the overhead needed in tracking through these branches in the PHT 210. In another implementation, an offline compiler (110) with profile-directed-feedback mechanisms can also use the collected performance statistics and recompile the program code to the same effect.

According to an embodiment, two example new instructions (and/or instruction variants) are introduced to be processed by the processor pipeline 102, and sending control inputs to the global path history register 212 in the branch prediction structure 103:

Skip branch history pattern (SBPT); and

Allow branch history pattern (ABPT).

As understood by one skilled in the art of defining instruction architectures, these 2 new instructions (SBPT and ABPT) are mainly for illustration. It should be appreciated that one can also define a branch prediction control (BPC) instruction that blocks and/or allows branch results (i.e., past histories) to be captured into the current branch history pattern 213 or not (for use with the pattern history table 210), in another implementation.

In another implementation discussed herein, the block/skip branch pattern instruction (of the software application 107) may also specify a predetermined number of subsequent branch instructions to be blocked, and the branch prediction structure 103 is configured to skip the branch results (i.e., past histories) of the predetermined number of branch instructions from being captured into the current branch history pattern 213.

As the SBPT instruction is executed, the branch prediction logic of the branch prediction structure 103 is configured to remember the start of such block branch history pattern mode, and create a snapshot of past history pattern up to this point (to be used later to reform the current history pattern when normal operation resumes). In some embodiments, the current history pattern may continue to be generated normally, after the snapshot, so these branches (although "skipped") may still be collected as part of the history pattern such that the subsequent branches may still be predicted using the PHT as usual. However, such current history pattern is only temporarily used. When the branch prediction structure 103 determines that it no longer needs to stay in this block branch history pattern mode (by the execution of ABPT, after a specified number of branches is completed, after a preset maximum number of skipped branches is detected, and/or after a context switch), the branch prediction structure 103 collapses the history pattern by restarting the history pattern with the history pattern snapshot made earlier, thus ignoring all the history patterns (from the "skipped" branches) when this block branch history pattern mode is active.

Figure 4:
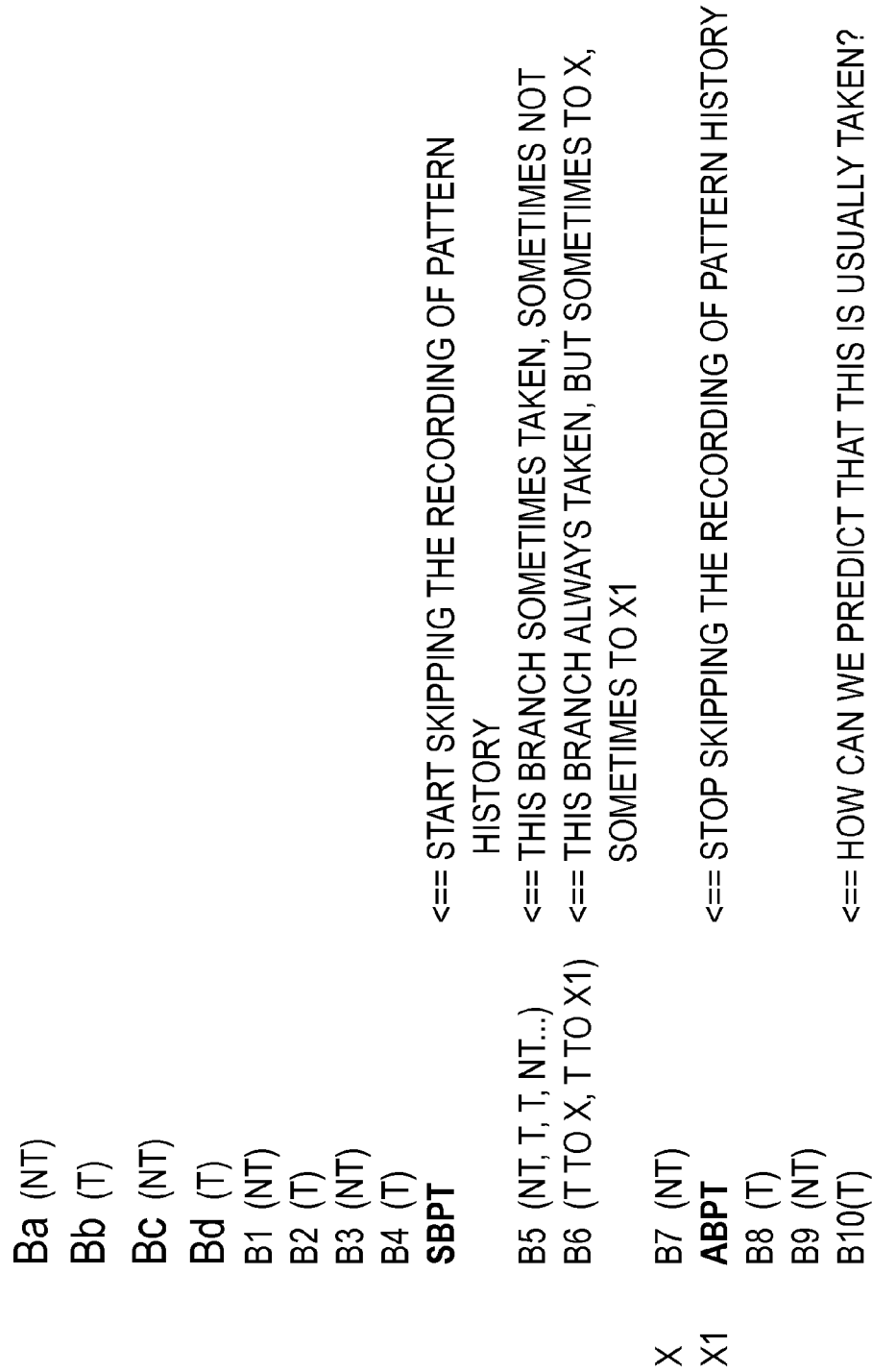
FIG. 4 depicts a set of branch history patterns and its corresponding pseudo code listing only branch instructions along with inserted skip branch pattern and allow branch pattern instructions in accordance with an embodiment.

Using the above example of the set of history patterns for the pseudo code from FIG. 3, FIG. 4 extends the history pattern of the pseudo code further backwards in history/time, now including branches Ba, Bb, Bc and Bd. Further, FIG. 4 illustrates the same set of history patterns and its pseudo code, listing only branch instructions, along with the inserted skip branch history pattern (SBPT) and allow branch history pattern (ABPT) instructions according to an embodiment.

Referring to FIG. 4, when SBPT is encountered, the branch prediction logic of the branch prediction structure 103 is configured to capture the past history pattern of (NT, T, NT, T, NT, T, NT, T respectively for branches Ba, Bb, Bc, Bd, B1, B2, B3, B4) and create a snapshot of that pattern for later use. In the meantime, the history pattern continues to build with results from B5, B6 to potentially be used to predict B6, B7 correspondingly. When ABPT is encountered, the global history logic 212 of the branch prediction structure 103 is configured to "drop" (or skip) the history pattern of branches B5, B6, B7, and restart the history pattern by reusing the snapshot history pattern (NT, T, NT, T, NT, T, NT, T respectively for branches Ba, Bb, Bc, Bd, B1, B2, B3, B4) instead for future prediction. In other words, the history pattern of branches B5, B6, B7 is no longer recorded for use with the pattern history table 210 and may not be used for predicting subsequent branches (e.g., not used for predicting branch B8, B9 and B10).

Accordingly, using prediction of B10 as an example, the history pattern of a depth of 8 (that is stored in the pattern history table 210) needed to predict B10 as taken (T) becomes NT, T, NT, T, NT, T, T, NT==>T (for Bc, Bd, B1, B2, B3, B4, B8, B9).

It is recognized that the past histories of B5, B6, B7 are absent from the above pattern history table entry that is to be saved in the pattern history table 210 for use for future predictions. Now, the pattern history table 210 of the branch prediction structure 103 is configured to use (only) 1 history pattern to predict the outcome of B10 as taken, thereby reducing the history storage requirement from 4 pattern history table entries (discussed earlier with reference to FIG. 3) to 1 pattern history table entry.

If the program code is more complicated, it can be seen how embodiments improve the effectiveness (or effective capacity) of the pattern history tables 210. It is noted that, after SBPT is executed, the prediction algorithm used for branch B6 (as an example), if PHT 210 is required, may still follow the "normal" design, and may use the actual direction of branch B5 as part of the current, but temporary (or transient), pattern history to predict B6's outcome.

The SBPT and ABPT (and/or after a number of specified branch instructions) works in pairs, mainly to collapse (i.e., not store certain history patterns) the highly uncertain part of a program code, which leads to a more effective PHT 210 capacity and better potential of branch prediction results.

Instead of a transient state design, a similar effect can be achieved by providing an override control immediately prior to a branch instruction and instruct the global history logic 212 in the branch prediction structure 103 to force a specified direction of the branch to be recorded as part of the history pattern regardless of the actual outcome according to an embodiment. For example, a force branch history pattern (FBPT) instruction, or its variants, that can force skipping the branch pattern history of the next immediate branch or force a certain direction of the next branch to be recorded may be the following:

FBPT-S which will force the next immediate branch to not be recorded as part of the branch history pattern;

FBPT-N which will force the next immediate branch to be recorded as not taken as part of the branch history pattern; and FBPT-T which will force the next immediate branch to be recorded as taken part of the branch history pattern.

Again using the previous example of pseudo code in FIG. 3 that has been extended further backwards into history/time (e.g., with branches Ba, Bb, Bc, Bd) as in FIG. 4, FIG. 5 illustrates the set of history patterns and its corresponding pseudo code, listing only branch instructions, along with the inserted force branch history pattern (FBPT) instructions (such as, e.g., FBPT-S, FBPT-N, FBPT-T) according to an embodiment.

Again, using prediction of branch B10 as an example, the pattern history table entry of a depth of 8 (that is stored in the pattern history table 210) needed to predict B10 as taken (T) becomes NT, T, NT, T, NT, T, T, NT==>T (for B1, B2, B3, B4, B5, B6, B8, B9) where (recorded prior history for) B7 is skipped, and (recorded prior history for) B5 is forced to NT even if B5 would have resulted as T.

As can be seen, the pattern history table 210 of the branch prediction structure 103 is configured to use (only) 1 history pattern to predict the outcome of B10 as taken, thereby reducing the history storage requirement from 4 pattern history table entries (discussed earlier with reference to FIG. 3) to 1 pattern history table entry according to FIG. 5.

FIG. 6 is a flow chart 600 of a software instructed dynamic branch history pattern adjustment executed by the processor 101 according to an embodiment. The software application 107 is configured to instruct the branch prediction structure 103 not to record "n" branches into the current branch history pattern 213 in the global history control 212. The flow chart 600 illustrates logic that may be implemented by the branch prediction structure 103.

At block 605, the software application 107 is configured to insert skip branch history pattern instruction(s) before one or more branch instructions configured to skip recording past history for each of these branch instructions as part of branch history pattern.

At block 610, in response to the software application 107 inserting the one or more skip branch history pattern instructions configured to skip recording past history for each of these branch instructions as part of branch history pattern, the branch prediction structure 103 is configured to execute skip branch history pattern instruction(s) and take a snapshot of past histories as part of the branch history pattern for previous branch instructions not skipped. For example, the branch prediction structure 103 is configured to read the skip branch history pattern instruction(s) and execute accordingly.

At block 615, the branch prediction structure 103 is configured to check if there is a predetermined number of branch instructions having their results (e.g., the results are the taken or not taken past history) skipped from being recorded as part of the branch history pattern.

At block 620, if yes, the branch prediction structure 103 is configured to continue skipping the recording of past history as part of branch history pattern for branch instructions until the predetermined number of branch instructions (all of which are having their past history not recorded) has been reached. For example, the skip branch history pattern instruction may be for 5 branch instructions.

At block 625, the branch prediction structure 103 is configured to check whether the predetermined number of branch instructions having their results skipped as part of branch history pattern been reached.

At block 630, if yes, the branch prediction structure 103 is configured to stop skipping recording of past history. If no, the flow returns to block 620 to continue skipping recording of past history as part of branch history pattern. At block 632, after the skip recording is stopped, the snapshot of history pattern taken at block 610 may be used to resume as the current branch history pattern 213.

At block 635, the branch prediction structure 103 is configured to prevent the number of branch instructions from being recorded as part of branch history pattern and from being used to predict subsequent branch instructions.

At block 640, if no at block 615, the branch prediction structure 103 is configured to continue skip recording past history of branch instructions as part of branch history pattern until allow branch history pattern instruction (e.g., ABPT) is reached and executed.

At block 645, the branch prediction structure 103 is configured to check if the allow branch pattern history instruction is reached and executed. If yes, the allow branch pattern history instruction is reached, the branch prediction structure 103 is configured to stop skip recording of prior history as part of the branch pattern history at block 630. If no, the branch prediction structure 103 is configured to check if the context switch or preset maximum number of skipped branches detected at block 647. If no at block 647, the flow returns to block 640, and if yes at block 647, the flow proceeds to block 630.

FIG. 7 is a computer implemented method 700 for dynamic branch history pattern adjustment by the processor 101 (i.e., processing circuit) according to an embodiment.

At block 705, the branch prediction structure 103 is configured to collect past histories of branch instruction results as part of a branch history pattern.

At block 710, the branch prediction structure 103 is configured to predict with a pattern history buffer 212 the direction of a branch instruction using the branch history pattern.

At block 715, the branch prediction structure 103 is configured to execute branch history pattern recording adjustment instructions prior to one or more branch instructions.

At block 720, executing the branch history pattern recording adjustment instruction changes a default behavior (e.g., changes the traditional behavior) of recording and usage of the branch history pattern.

The branch history pattern recording adjustment instruction causes: skipping of a past history of the one or more branch instructions such that the past history of the one or more branch instructions is prevented from being recorded as part of the branch history pattern; and skipping to discontinue for the past history of the one or more branch instructions, such that the past history of a subsequent branch instruction is not skipped.

In order to discontinue skipping the past history of the one or more branch instructions, the branch prediction structure 103 is configured to execute an allow branch history pattern instruction (ABPT) that is defined as a branch history pattern recording adjustment instruction. The allow branch history pattern instruction (ABPT) causes a previously snapshotted history pattern to be used for resuming normal operation, and the past history of the subsequent branch instruction to be recorded as part of the history pattern, where the past history of the subsequent branch instruction may be utilized for subsequent branch predictions.

In order to discontinue skipping the past history of the one or more branch instructions, the branch prediction structure 103 is configured to stop skipping the past history of the one or more branch instructions when a predetermined number of the one or more branch instructions (as specified in the stop branch history pattern instruction) is reached. In response to the branch prediction structure 103 executing the predetermined number of the one or more branch instructions, the branch prediction structure 103 resumes normal operation by using the previously snapshotted history pattern as the current history pattern, and allows the past history of the subsequent branch instruction to be recorded as part of the history pattern, where the past history of the subsequent branch instruction may be utilized for subsequent branch predictions.

By the past history of the one or more branch instructions being prevented from being recorded into the history pattern, the branch prediction structure 103 is configured to block the past history of the one or more branch instructions from being utilized for subsequent branch predictions.

The branch prediction structure 103 is configured to force the past history of one branch instruction to be recorded as taken (T) as part of the history pattern regardless of an actual branch result/outcome of the one branch instruction. The branch prediction structure 103 is configured to force the past history of one branch instruction to be recorded as not taken (NT) as part of the history pattern regardless of an actual branch result of the one branch instruction.

Technical effects and benefits include improved performance in a computer processor. Technical effects and benefits include how to use the concept of blocking branch history patterns to be more effective in capturing branch history patterns, and thus allow more branch history patterns to be captured within a fixed size structure.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer implemented method for dynamic branch history pattern adjustment, the method comprising:
   collecting past histories of branch instruction results as part of a branch history pattern;
   predicting, by a branch prediction structure with a pattern history buffer, a direction of a first branch instruction using the branch history pattern;
   executing, by the branch prediction structure, one or more branch history pattern recording adjustment instructions prior to one or more branch instructions;
   wherein executing the one or more branch history pattern recording adjustment instructions changes default behaviors of recording and usage of the branch history pattern;
   in response to the one or more branch instructions having inconsistent results of taken and not taken, performing the following:
      recording, in the pattern history buffer, a past history of prior branch instructions prior to execution of the one or more branch instructions;
      blocking recording, in the pattern history buffer, of a past history of the one or more branch instructions;
      continuing recording, in the pattern history buffer, of a past history for subsequent branch instructions being executed after execution of the one or more branch instructions, wherein the branch history pattern, in the pattern history buffer, comprises the past history of the prior and subsequent branch instructions formed without the past history of the one or more branch instructions;

performing branch prediction for the first branch instruction using the branch history pattern comprising the past history of the prior and subsequent branch instructions excluding the past history of the one or more branch instructions;
forcing a past history of a second branch instruction to be recorded as taken as part of the branch history pattern regardless of an actual branch result of the second branch instruction.

2. The method of claim 1, wherein the one or more branch history pattern recording adjustment instructions are variously executable to cause:
skipping the past history of the one or more branch instructions such that the past history of the one or more branch instructions is prevented from being recorded as part of the branch history pattern; or
discontinuing skipping the past history of the one or more branch instructions, such that a past history of a subsequent branch instruction is not skipped.

3. The method of claim 2, wherein, skipping includes taking a snapshot of a current branch history pattern, and discontinuing includes resuming the current branch history pattern from the snapshot and the past history of the subsequent branch instruction to be recorded as part of the branch history pattern.

4. The method of claim 2, wherein, in order to start skipping of the past history of the one or more branch instructions, the branch prediction structure is configured to execute a stop branch history pattern instruction that is defined as a branch history pattern recording adjustment instruction.

5. The method of claim 4, wherein, in order to discontinue skipping the past history of the one or more branch instructions, the branch prediction structure is configured to discontinue skipping the past history of the one or more branch instructions when a predetermined number of the one or more branch instructions as specified in the stop branch history pattern instruction is reached.

6. The method of claim 2, wherein, in order to discontinue skipping the past history of the one or more branch instructions, the branch prediction structure is configured to execute an allow branch history pattern instruction that is defined as a branch history pattern recording adjustment instruction.

7. The method of claim 1, further comprising forcing a past history of a third branch instruction to be recorded as not taken as part of the branch history pattern regardless of an actual branch result of the third branch instruction.

8. A computer program product for implementing dynamic branch history pattern adjustment, the computer program product comprising:
a computer readable storage medium having program instructions embodied therewith, the program instructions readable by a processing circuit to cause the processing circuit to perform a method comprising:
collecting past histories of branch instruction results as part of a branch history pattern;
predicting, by a branch prediction structure with a pattern history buffer, a direction of a first branch instruction using the branch history pattern; and
executing, by the branch prediction structure, one or more branch history pattern recording adjustment instructions prior to one or more branch instructions;
wherein executing the one or more branch history pattern recording adjustment instructions changes default behaviors of recording and usage of the branch history pattern;
in response to the one or more branch instructions having inconsistent results of taken and not taken, performing the following:
recording, in the pattern history buffer, a past history of prior branch instructions prior to execution of the one or more branch instructions;
blocking recording, in the pattern history buffer, of a past history of the one or more branch instructions;
continuing recording, in the pattern history buffer, of a past history for subsequent branch instructions being executed after execution of the one or more branch instructions, wherein the branch history pattern, in the pattern history buffer, comprises the past history of the prior and subsequent branch instructions formed without the past history of the one or more branch instructions;
performing branch prediction for the first branch instruction using the branch history pattern comprising the past history of the prior and subsequent branch instructions excluding the past history of the one or more branch instructions;
wherein the one or more branch history pattern recording adjustment instructions are variously executable to cause:
skipping the past history of the one or more branch instructions such that the past history of the one or more branch instructions is prevented from being recorded as part of the branch history pattern; or
discontinuing skipping the past history of the one or more branch instructions, such that a past history of a subsequent branch instruction is not skipped;
wherein, in order to discontinue skipping the past history of the one or more branch instructions, the branch prediction structure is configured to discontinue skipping the past history of the one or more branch instructions when a predetermined number of the one or more branch instructions as specified in a stop branch history pattern instruction is reached;
forcing a past history of a second branch instruction to be recorded as taken as part of the branch history pattern regardless of an actual brand result of the second branch instruction.

9. The computer program product of claim 8, wherein, skipping includes taking a snapshot of a current branch history pattern, and discontinuing includes resuming the current history pattern from the snapshot and the past history of the subsequent branch instruction to be recorded as part of the branch history pattern.

10. The computer program product of claim 8, wherein, in order to start skipping of the past history of the one or more branch instructions, the branch prediction structure is configured to execute the stop branch history pattern instruction that is defined as a branch history pattern recording adjustment instruction.

11. The computer program product of claim 8, wherein, in order to discontinue skipping the past history of the one or more branch instructions, the branch prediction structure is configured to execute an allow branch history pattern instruction that is defined as a branch history pattern recording adjustment instruction.

12. The computer program product of claim 8, further comprising forcing a past history of a third branch instruction to be recorded as not taken as part of the branch history pattern regardless of an actual branch result of the third branch instruction.

13. A computer system for dynamic branch history pattern adjustment, the system comprising:

a memory; and a processor, communicatively coupled to the memory, the computer system configured to perform a method comprising:

collecting past histories of branch instruction results as part of a branch history pattern;

predicting, by the processor comprising a branch prediction structure with a pattern history buffer, a direction of a first branch instruction using the branch history pattern; and executing, by the branch prediction structure, one or more branch history pattern recording adjustment instructions prior to one or more branch instructions;

wherein executing the one or more branch history pattern recording adjustment instructions changes default behaviors of recording and usage of the branch history pattern;

in response to the one or more branch instructions having inconsistent results of taken and not taken, performing the following:

recording, in the pattern history buffer, a past history of prior branch instructions prior to execution of the one or more branch instructions;

blocking recording, in the pattern history buffer, of a past history of the one or more branch instructions;

continuing recording, in the pattern history buffer, of a past history for subsequent branch instructions being executed after execution of the one or more branch instructions, wherein the branch history pattern, in the pattern history buffer, comprises the past history of the prior and subsequent branch instructions formed without the past history of the one or more branch instructions;

performing branch prediction for the first branch instruction using the branch history pattern comprising the past history of the prior and subsequent branch instructions excluding the past history of the one or more branch instructions;

forcing a past history of a second branch instruction to be recorded as taken as part of the branch history pattern regardless of an actual branch result of the second branch instruction.

14. The computer system of claim 13, wherein the one or more branch history pattern recording adjustment instructions are variously executable to cause:

skipping the past history of the one or more branch instructions such that the past history of the one or more branch instructions is prevented from being recorded as part of the branch history pattern; or discontinuing skipping the past history of the one or more branch instructions, such that a past history of a subsequent branch instruction is not skipped.

15. The computer system of claim 14, wherein, skipping includes taking a snapshot of a current history pattern, and discontinuing includes resuming the current branch history pattern from the snapshot and the past history of the subsequent branch instruction to be recorded as part of the branch history pattern.

16. The computer system of claim 14, wherein, in order to start skipping of the past history of the one or more branch instructions, the branch prediction structure is configured to execute a stop branch history pattern instruction that is defined as a branch history pattern recording adjustment instruction.

\* \* \* \* \*